United States Patent [19]

Jakob

[11] 3,985,345

[45] Oct. 12, 1976

[54] CONTINUOUS COMPOUNDING AND MIXING APPARATUS

[75] Inventor: Peter Michael Jakob, Offenbach, Germany

[73] Assignee: Colortronic Reinhard & Co., KG, Friedrichsdorf-Koppern, Germany

[22] Filed: Oct. 17, 1974

[21] Appl. No.: 515,756

Related U.S. Application Data

[63] Continuation-in-part of Ser. No. 386,902, Aug. 9, 1973, abandoned.

[30] Foreign Application Priority Data

Aug. 15, 1972 Japan.............................. 47-81760

[52] U.S. Cl. .................................... 259/8; 259/24; 259/DIG. 17
[51] Int. Cl.² ...................... B01F 7/20; B01F 15/02; B01F 15/04
[58] Field of Search .............. 259/8, 23, 24, 43, 44, 259/66, 67, 154, 158, DIG. 17, 182

[56] References Cited

UNITED STATES PATENTS

| | | | |
|---|---|---|---|
| 2,605,084 | 7/1952 | Reents | 259/1 R |
| 3,560,430 | 2/1971 | Meyer | 259/8 X |
| 3,664,642 | 5/1972 | Morin | 259/8 |

FOREIGN PATENTS OR APPLICATIONS

| | | | |
|---|---|---|---|
| 255,452 | 6/1960 | Australia | 259/DIG. 17 |

*Primary Examiner*—Edward L. Roberts
*Assistant Examiner*—Alan Cantor
*Attorney, Agent, or Firm*—Sughrue, Rothwell, Mion, Zinn and Macpeak

[57] ABSTRACT

A continuous mixing vessel for polymer processing materials characterized in that the progress of the materials being mixed through the mixing volume is substantially vertical so as to permit natural subsidence of the materials, whereby mixture of the materials is caused by the effects of the different subsiding speeds of the materials and the gradient in the subsiding speed between the center and wall portions of the mixing vessel. Horizontal agitators are preferably provided, but they must induce no vertical movement of the materials. A hot wind may be introduced into a lower portion of the mixing vessel and be exhausted from an upper portion of the mixing vessel after having dried the materials as it moves through them in counterflow.

5 Claims, 6 Drawing Figures

CONTINUOUS COMPOUNDING AND MIXING APPARATUS

CROSS-REFERENCE TO RELATED APPLICATION

This application is a continuation-in-part of application Ser. No. 386,902, filed Aug. 9, 1973, and abandoned upon the filing of this application.

BACKGROUND OF THE INVENTION

The present invention relates to a continuous compounding and mixing apparatus which performs automatic measuring, compound, mixing, and feeding operations in the stage of mixing and feeding various materials to a polymer processor.

In processing a polymer, some addition agent, pigment, and at least one other kind of polymer are compounded and mixed with a polymer material in most cases. In these operations, the most frequent and technically difficult one in view of accuracy is the compounding and mixing of a pigment. Accordingly, at present, there is an extremely urgent demand in this field for equipment that is capable of performing automatic measuring, compounding, mixing, and feeding of each component with high accuracy in the stage preceding a polymer processor. Some proposals are already provided, but there exists no product functionally satisfactory.

Common features in the conventional feed systems in the field intended for compounding and mixing of pigment with a relatively high accuracy are that a major component material and a minor component material are measured and fed by a batch method and that a mixer is also based on the batch method. That is to say, according to the technical concept common in the conventional systems, since the pigment is extremely small in quantity as compared to the polymer, the pigment quantity in one automatic measurement is increased up to the absolute quantity wherein the required measuring accuracy is attainable, and further the polymer with which the pigment is to be mixed is measured by the batch method as one lot of a large amount corresponding to said absolute quantity, and then the polymer and the pigment are combined.

For example, under the requirements that the minimum concentration of pigment against polymer is 0.1 percent and the mixing accuracy is within ±1 percent thereof, and that an automatic pigment measuring equipment is capable of measuring with the accuracy of ±0.1 gram, then it is necessary to measure at least 10 grams as the quantity of pigment corresponding to the measuring accuracy of ± percent. Since the polymer quantity 10 kilograms corresponds to the concentration 0.1 percent of pigment 10 grams, under such conditions, the desired accuracy is supposed to be obtained by regarding 1.0 kilogram of polymer as one batch quantity in measurement.

In the present state, automation is still incomplete, and most operations are performed manually (particularly in fields where a high accuracy is required). Also, in conventional automated systems, with the same intention to improve the measuring accuracy by enlarging the measuring size, amounts ranging from 100 to 200 grams are measured by the batch method and are mixed by means of a tumbler mixer based on the batch principle. In other words, in the conventional automation system, the attempt is merely to mechanize the system with respect in the conventional manual operation.

Accordingly, in such conventional automation systems, there occurs the defect that the mixing accuracy of concentration is low in practical function. That is to say, since a system is installed for each polymer processor, as viewed from installation cost and operational reason, it is impossible to employ a large batch quantity above 100 kilograms as in the manually operated tumbler mixer. One batch quantity in the conventional automatic mixer ranges from 5 to 10 kilograms. In the case of 10 kilograms, the quantity corresponding to the present concentration 0.1 to 2.0 percent is from 10 to 200 grams, so that a measuring accuracy of ±0.10 gram is required for attaining the accuracy of ±1 percent. Considering the physical property of pigment and the conditions of allowable installation cost, it will be almost impossible to realize automatic measuring equipment that can perform measurement up to a maximum of 200 grams and yet with the high accuracy of ±0.10 gram. Consequently, in a typical example based on the conventional method, a concentration error of ±5 percent is indicated in the use of the pigment concentration of 1.0 percent.

The reason for the difficulty in attaining a satisfactory automation system as described above is attributed to the following causes:

1. The pigment being a smaller mixture component (minor component) is often of viscous property and thereby causes bridging. That is to say, the powder is liable to get stuck, so that handling for measurement in a measuring equipment is difficult.

2. The required variation range for the mixing concentration of pigment against polymer is so wide as to cover from 0.005 to 8 percent, and mixing should be possible at least in a range from 0.1 to 2.0 percent. Furthermore, the accuracy of the pigment component is required to be ±2 percent, preferably ±1 percent, against the concentration.

3. Since the industrial unit of a processing installation system is remarkably small as compared with a chemical plant system, a high-class automation system is not usable, and the allowable investment amount for equipment is at most from about a half million yen to 1½ million yen. Accordingly, the allowable installation cost is excessively low in view of the strict requirement that the minor component of the mixture should be measured automatically in a wide mixing range and yet with a high accuracy through the entire range, notwithstanding its difficulty of handling.

4. Change of the kind of pigment (hereinafter referred to as color change) is so frequent that, unless the installation is constructed in an outstanding simplicity, the loss in working time or material when the apparatus is cleaned for a color change causes great economical effects.

In the case where a large quantity of fluid is handled in a chemical process plant, a continuous agitator is used as an efficient mixer. However, when the quantity to be processed in small with the minor component having little in quantity and yet a high accuracy is required, measuring and mixing based on the batch method are often employed even for liquid materials. Therefore, it has never been recognized heretofore that amelioration of the defects existing in the conventional method is attained at a cost lower than in the conventional method by the use of a continuous mixing vessel for the automatic measuring and mixing of polymer and pigment intended to be mounted to each polymer processor which is on a small industrial scale and presents so difficult a problem in view of accuracy that the required accuracy cannot be attained even by the batch type mixer. That is to say, the reason that the continuous mixing vessel serving as an automatic pigment measuring-mixing equipment to be mounted to each processor in the polymer processing industry has not been noted heretofore as viewed from practical utilization is attributed to the following causes:

a. When a high accuracy is required with respect to compounding ratio, in the case of a continuous mixing vessel to which materials should be fed substantially continuously, it has been affirmed that there is a great difficulty in performing measurement control by reading out the respective flow rate of polymer and pigment at the accuracy of ±1 percent or so.

b. In the stage of mixing the pigment and the polymer, a considerably complete mixing is required. And with the entire pigment adhering to the surfaces of polymer particles, a homogeneous state should be attained. For this reason, the pigment and the polymer are mixed for about an hour by a tumbler mixer according to the conventional method, or batch type mixing is performed according to the latest method for about 50 seconds by a high-speed mixer at the speed of 1500 to 2000 r.p.m.

In other words, generally there has been a previously accepted vague concept that complete mixing to meet the requirements of the above-described accuracy could not be achieved by a continuous mixer, and consequently an attempt to put the continuous mixer into practical use has been neglected.

On the other hand, for the purpose of attaining some agitation effects in a processor hopper itself, a rotating type agitator was provided inside the hopper on rare occasions. However, the object of such application was chiefly to suppress the separation of different kinds of materials while expecting merely supplementary agitation effects, differing from the object of this invention that mixes a plurality of materials for the first time in the processor hopper at a high-accuracy compounding ratio and thereby achieves complete mixing effects.

Now, the definition or essence of a continuous mixer will be analyzed. In a batch type mixer, a batch cycle operation is performed in such a manner that materials not mixed at all (hereinafter referred to as zero-mixed) are charged into an empty mixing vessel until reaching the effective capacity of the mixer, then mixing proceeds over a period of time, and finally the entire amount is discharged in the state where mixing has reached a required degree (hereinafter referred to as sufficiently mixed). The characteristics of this type of mixing process may be said to be that the mixing state changes with the lapse of time in every point in the mixing vessel and that the substance level in the mixing vessel repeats two states, i.e., a fully charged state and an empty state. In the continuous type mixer, its characteristics reside in that the mixing state at a certain point in the mixing vessel is kept substantially constant regardless of the lapse of time, and the substance level in the mixing vessel is always above a certain level so that there occurs no extremely great variation (hereinafter referred to as a substantially fixed level). In fact, the requisites for the continuous mixing vessel are that the substance level and the degree of mixing in the mixing vessel are to be substantially in steady state, but neither charge nor discharge need be completely continuous. On condition that the steady state average is maintained, intermittent charge or discharge causes no problem.

The object of this invention is to eliminate the defects in the above-described conventional feed system and to solve the problematical points in the process and apparatus, thereby providing a formerly unrecognized automatic system for measuring, compounding mixing, and feeding materials to a polymer processor on the basis of the analysis of the said continuous mixer.

In this invention, means taken for attaining a high-accuracy compounding ratio at relatively low cost are characterized as follows. As already mentioned, charging both polymer and pigment to the mixing vessel need not be continuous, and particularly the pigment of a minor quantity may be charged concentrically by a fixed amount (for example, 10 to 50 grams) at a certain point of time. It is convenient that this point of time is selected to be, for example, the moment when charging the polymer required for compounding the pigment has been terminated. Accordingly, it is important to grasp the polymer charging quantity not as an instantaneous value such as r.p.m. but as an integrated value with the required accuracy. In order to grasp the polymer charging quantity as an integrated value with a high accuracy, an exemplary embodiment of this invention adopts a method which digitally counts the number of feed units fed by an automatic measuring-feeding apparatus which discontinuously measures and feeds a fixed weight or capacity as a feed unit. A control circuit is so composed that when the amount counted by the digital counter has reached a preset value, a fixed amount of the pigment is fed. This can be carried into effect by providing a digital counter for the polymer side and a preset counter for setting where the pigment is to be fed. Moreover, it will also be possible to form the said control circuit in such configuration that, by the provision of digital counters and feed quantity preset counters for both pigment and polymer sides, the pigment and the polymer are counted independently of each other by the counters until they have reached the respective values previously set by the preset counters. The probable causes interrupting the acquisition of a complete mixture at the discharge outlet in the continuous mixer include that the zero-mixed materials, immediately after being charged, make a short pass directly to the discharge outlet so that an accurate stay time (mixing time) cannot be given to the entire charged materials, and also that there occurs separating action resulting from the centrifugal force or gravity of each material.

For the purpose of preventing such a short pass, this invention employs the following means to achieve a remarkably satisfactory result for a simple structure. The said means is to emphasize the piston flow character with respect to the travel of the materials in the mixing vessel and simultaneously to decrease the back flow caused by the agitator. In this invention, in order to naturally form a flow without opposing the natural flow of the substance in the mixing vessel due to gravity, the mixing vessel is shaped to be substantially vertical so as to effect charging in the upper portion and discharging from the lower portion.

In an attempt to prevent the occurrenece of back flow, this invention employs a rotary agitator whose rotating shaft is substantially vertical, meaning that the plane of rotation is substantially horizontal. Additionally, the shape of the agitator vanes (particularly at the level immediately below the material charging port) is selected to be that of a horizontal flat plate, avoiding vanes that have a vertical lead angle and thereby minimizing the occurrence of vertical discharging component force. Square rods, round rods, and elliptical rods without vertical pitch have also been selected.

The fact that the rotation plane of the agitator is horizontal means that the plane of rotation drawn by each agitation vane around the rotary shaft is horizontal, but it does not mean that the agitation vane per se should be constructed horizontally. In order to obtain an agitation vane having no angle of lead in the vertical direction, it is necessary for it not to have an angle of rake to a circle drawn by rotation of each part of the agitation vane in a broad plane such as in the case of a propeller. Accordingly, the agitation vanes are formed from angular rods, round rods, or the like. It is not always indispensable that they extend horizontally. However, they must be designed so that they produce no extrusion force in the vertical direction even though the material is bent or distorted in any manner whatever.

The separation trouble resulting from gravity or centrifugal force differs with the combination of material components to be mixed, so that a sweeping statement may not be given. The ordinary pigment has a sufficiently strong adhesion to the charged polymer so that, in mixing pigments of less than several percent against the polymer, it has been confirmed experimentally that the use of the above-described mixer is capable of completely eliminating the feared problem of separation.

In any special case other than the mixture of ordinary pigment and polymer wherein separation is liable to occur due to the absence of adhesion and/or wide difference is subsidence properties depending on gravity or grain size, the speed of rotation of the agitator may be made variable or so set as to be switched over to intermittent rotation in order to avoid separation resulting from the centrifugal force of the agitator. Next, for the purpose of obtaining at the outlet port of the continuous mixing vessel a desired mixing ration which is always uniform and fixed, this invention positively adopts the following means.

BRIEF DESCRIPTION OF THE DRAWINGS

As shown in FIG. 1, the subsiding speed of the substance varies in the radial direction on the horizontal cross section of the mixing vessel, and generally the speed becomes higher from the side wall portion toward the center. Therefore, even when ideal horizontal agitation is being performed, the radial difference in the vertical subsiding speeds of the substance shown in FIG. 1 is combined with the horizontal incessant averaging of the substance caused by horizontal agitation, and eventually the concentration of the minor component material in the vertical direction of the mixing vessel is distributed as shown in FIG. 2, even if a spot charge is effected as described above. It is recognized experimentally as well. In other words, vertical averaging can be effected ideally by the radial subsiding speed difference even if the agitator vanes have no vertical discharging action. In FIG. 2, C denotes one program cycle, that is, a time interval from the point of time for charging the material component of the least charge frequency to the next charging point of time. FIG. 2 shows the case where materials of five program cycles to be charged are laminated in the mixing vessel, and the minimum number of program cycles is experimentally selected on the basis of the principle illustrated in FIG. 3. In FIG. 3, 1 is a mixing vessel, and $h$ is its effective height, $L_3$ is the distance that the substance in the vessel has subsided along the vessel wall surface of the slowest subsidence during the time required for the substance to subside through the distance $L_2$ in the center of the vessel. In this case, the maximum amount of program cycle usable against height $h$ of the vessel 1 may be roughly considered the amount occupying the difference $(t)$ between $L_2$ and $L_3$ in the vessel. The factors affecting the necessary number of program cycle laminations are: (i) Shape and diameter of the mixing vessel; (ii) Shape of agitator; (iii) Rotation speed of agitator; and (iv) Material consumption speed of polymer processor. (Greater depth is required as the process quantity is larger.) Practically, when the shape and diameter of mixing vessel and the shape of agitator are determined, the minimum necessary height of the mixer vessel can be obtained by feeding the materials and discharging the mixture substance from the discharge outlet at a flow speed corresponding to the maximum working flow rate, subsequently feeding the polymer from the feed inlet of the mixer at the maximum working program cycle while rotating the agitator at the rated speed under the working conditions, then locally charging a small amount of the coloring polymer pellet (for example, 0.5 percent of the polymer) into the polymer of each program cycle at a predetermined position, and finally increasing the substance level in the mixing vessel until the coloring polymer pellet comes out always at a uniform concentration from the discharge outlet. The level of the substance thus obtained is the minimum necessary height in the effective height of the mixing vessel.

Figure 1:
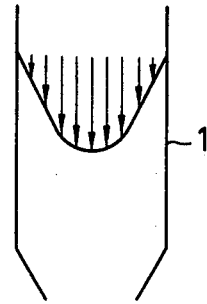
FIG. 1 shows subsidence speed of the material substance in the continuous mixing vessel of this invention.
Figure 2:
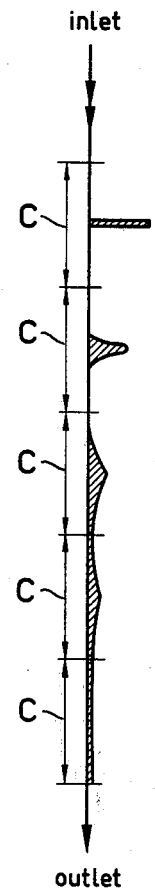
FIG. 2 illustrates how mixing of the minor component material proceeds in the continuous mixing vessel of this invention.

More specifically, in accordance with this invention, there is provided an apparatus for performing a process for mixing polymer processing materials comprising feeding quantitatively a major polymer, another polymer, a pigment, and additives from a feed inlet to a mixing vessel through respective metering mechanisms, compounding them in the mixing vessel, and feeding the mixture to a polymer processor from a discharge outlet of the mixing vessel, said process being characterized in that said starting polymer material is allowed to sink, substantially vertically by gravity, in a mixing space extending from said feed inlet to said discharge outlet to thereby form a continuous moving flow of the polymer material extending to the polymer processor through said discharge outlet. The starting polymer material is successively supplied at a feed rate such that the lowering of the upper level of the polymer material in the mixing vessel by discharge of the polymer material from the discharge outlet is compensated to keep the upper level of the polymer material in the mixing vessel substantially constant and to keep said mixing space always filled with polymer material. Each component is fed in an amount corresponding to the prescribed mixing ratio at an optional metered feed rate. If the ratio of the components fed at a certain moment is different from the prescribed composition ratio, said difference remains unregulated, and the non-uniformity of the starting material composition in the mixing vessel is regulated (1) by forcibly moving the starting material in a horizontal direction at many points in the mixing vessel by mechanical energy to make the composition homogeneous with respect to the horizontal direction and (2) by utilizing the difference in the sinking speed of the starting materials with respect to the radial direction from the center of the mixing vessel to the peripheral wall thereof (this difference being created by the continuous movement of the starting materials in the mixing vessel by gravity) to make the composition homogeneous with respect to the vertical direction. Further, in accordance with this invention, there is provided a mixing vessel for use in the above mixing process. That mixing vessel comprises (1) at least one feed inlet (disposed in the upper portion of the mixing vessel) for feeding a plurality of starting components of the polymer material, (2) at least one discharge outlet disposed in the lower portion of the mixing vessel, and (3) metering devices for respective components mounted on the upper portion of the mixing vessel. The mixing vessel is characterized (1) in that a substantially vertical mixing space is provided in the mixing vessel for the starting polymer material to sink by gravity from the feed inlet, (2) in that at least one rotary agitator having a substantially vertical rotary shaft is provided in the mixing vessel, and (3) in that agitation vanes giving substantially no vertical impetus to the materials being mixed are provided on the rotary agitator The rotary agitator is free of pitches generating vertical component forces causing vertical movements of the starting polymer material in the mixing vessel and is so constructed that the starting polymer material is moved ony in a substantially horizontal direction by rotation of the agitation vanes, whereby the non-uniformity of the composition of the polymer material with respect to the vertical direction is regulated to make the composition homogeneous while the polymer material is transferred from the feed inlet to the discharge outlet.

DETAILED DESCRIPTION OF THE PREFERRED EMBODIMENT

Now an exemplary embodiment of this invention will be described with reference to FIG. 4, in which: 1 is a mixer of this invention; 2 is a rotary agitator; 3 is a motor for the agitator; 4 is a level switch; 5 is a plastic hopper; 6 is a volumetric plastic measuring-feeding disk; 7 is a plastic feed inlet port; 8 is a digital signal generator for a plastic measuring-feeding apparatus; 9 is a motor for the plastic measuring-feeding apparatus; 10 is a pigment hopper; 11 is a volumetric pigment measuring-feeding disk; 12 is a pigment feed inlet port; 13 is a digital signal generator for a pigment measuring-feeding apparatus; 14 is a motor of the pigment measuring-feeding apparatus; 15 is a plastic processor; and 16 is a material inlet port of the plastic processor; 17 are pumps for sending a hot wind into a lower portion of the mixer; and 18 is a pump for exhausting the hot wind from an upper portion of the mixer.

Figure 3:
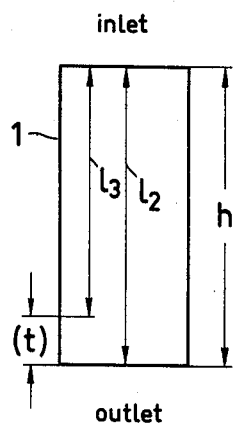
FIG. 3 shows a difference between the subsidence distances of the material substance in the mixing vessel.

If the plastic consumption quantity of processor 15 appears directly and quantitatively at the material inlet port 16 of the processor 15, as it typically does in injection, extrusion, and blow molding apparatus, then the mixer 1 of this invention can be mounted directly to the material inlet port 16 of the processor without requiring any hopper or delivery piping. Plastic processor 15 shown in FIG. 4 is an injection molding machine the injection weight of which is 2.5 kilograms, the injection cycle of which is 60 seconds, and the consumption per hour of which is 150 kilograms. Mixer 1 is capable of continuously mixing the pellet or powder plastic supplied from plastic hopper 5 through plastic feed inlet port 7 with powder pigment supplied from pigment hopper 10 through pigment feed inlet port 12. The 2-dot broken line in the upper portion of mixer 1 shows the material level. Level switch 4 is of the ordinary type that generates on-off signals in a relatively narrow level variation range. The plastic and the pigment are fed respectively by motors 9 and 14 which are placed in operation according to the low-level signal generated by the level switch 4. Plastic measuring-feeding disk 6 is a known horizontal circular measuring disk having a plurality of holes formed vertically at equiradial angles around the circumference of the disk. The holes are filled with the plastic from plastic hopper 5 by gravity, and when the holes have arrived at the position of plastic feed inlet port 7 with the rotation of the disk, only the plastic in the holes is dropped into mixer 1 because the disk is so formed that the holes are interrupted from the upper space by the upper surface of the disk. Pigment feeding disk 11 is also a horizontal circular measuring disk similar to disk 6. In the embodiment shown in FIG. 3, the capacity of one hole is 80 cubic centimeters in disk 6 and 40 cubic centimeters in disk 11. 8 and 13 are digital signal generators for the respective measuring-feeding apparatus, and serve to generate an electrical digital signal at each time the measuring-feeding disks 6 and 11 make a radial-angle rotation corresponding to one hole. Each signal generator can be formed into various configurations by known pulse generation technology.

Figure 4:
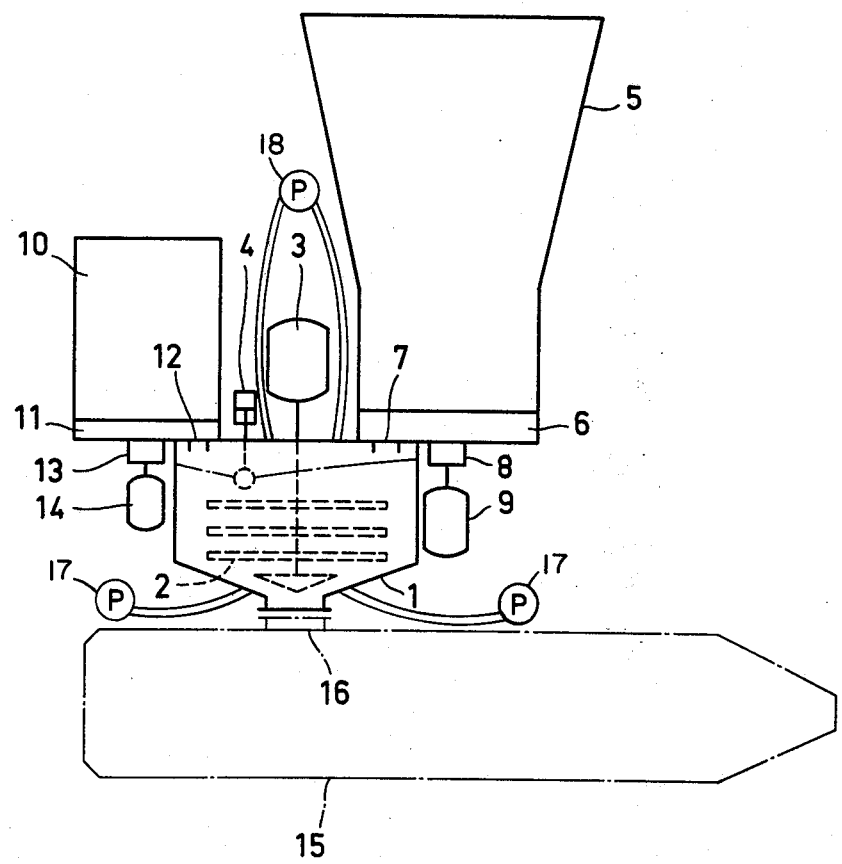
FIG. 4 shows an exemplary continuous mixing vessel embodying this invention.

In measurement of the plastic pellet or powder by means of a volumetric measuring-feeding apparatus as shown in FIG. 4, there arises generally the problem of whether a satisfactory accuracy can be attained or not in compounding the plastic and the pigment. However, according to the experimental results of this embodiment obtained after repeated experiments with the same plastic material being used, in the continuous discharge from 10 holes of the plastic measuring-feeding disk 6, the weight of the plastic corresponding to 10 holes was accurately within ±3 percent for a nominal weight of 361 grams. Furthermore, the material corresponding to 100 holes was weighed after repeated discharge, and the accuracy attained this time was within ±0.15 percent. Thus, in the case of a volumetric measuring-feeding apparatus, it has been found that, when the material to be fed is divided into small units and the number of fed units is digitally counted, the error is reduced towards zero as the operation time is longer.

As for pigment measuring-feeding disk 11, discharge experiments were conducted many times by using a pigment of good fluidity with the discharge weight per hole being 32 grams, and the result obtained was that the maximum scattering for each hold was ±0.9 percent. In an experiment where the number of holes for one weighing was increased, it has been found that the error decreases with an increase in the number of holes and that the accuracy attained is approximately in the same measuring error range as that of said plastic measuring-feeding disk 6.

A digital counter and a digital presetter are connected to the digital signal generator 8 on a control panel (not shown), to form a control circuit. The control circuit serves in such a manner that, when the count of the plastic measuring-feeding disk has reached a certain predetermined value, the pigment measuring-feeding disk 11 functions to feed a quantity corresponding to one hole. The operation of pigment measuring-feeding disk 11 to feed exactly the one-hole quantity is effected by an ordinary control system in which the start and stop of motor 14 are controlled by the digital signals from digital signal generator 13.

Now, when it is desired to feed the pigment 0.5 part by weight against the plastic 100 parts by weight, the digital setting to be made is as follows:

| Pigment | One-hole quantity | = | 32.0 grams |
|---------|-------------------|---|------------|
| Plastic | " | = | 36.1 grams |

Accordingly, for attaining the desired compounding ratio, the required number of holes for the plastic (digital set value) corresponding to one-hole quantity of the pigment is obtained by $$\text{Digital set value} = \frac{100}{0.5} \times \frac{32.0}{36.1} = 177$$

In this embodiment, since the minimum feed unit of pigment is as considerably large as 32 grams, at the low-concentration compounding of the pigment (for example, less than 0.5 percent), the plastic corresponding to one-charge quantity of the pigment becomes quite large. Namely, the quantity corresponding to 177 holes is 6.4 kilograms. In relation to this fact, the following two points should be taken into consideration with respect to the configuration of the mixer 1.

Firstly, in the control system wherein motor 9 is started by a low-level signal generated by level switch 4, and thereby the entire plastic quantity corresponding to the preset digital value (hereinafter referred to as one program cycle quantity) is fed continuously without fail, the level variation in mixer 1 is large so that it is impossible to form the mixer 1 into a small structure. Therefore, for ensuring stability of the level in mixer 1 and realizing a smaller mixer structure, it is advantageous to use a control system designed such that pigment and plastic feeding based on a digitally preset feed program is controlled with respect to only its proceeding or interruption by on-off signals from level switch 4. In such a system, the feeding based on the program is interrupted by the generation of an off-signal from the level switch 4 at any position during the program, and the feeding is resumed from the stop position of the program by the generation of an on-signal from level switch 4.

Secondly, since the 32 grams of pigment used in one program cycle are charged instantaneously as a batch to the plastic 6.4 kilograms on one program cycle quantity, there occurs extreme maldistribution locally in the composition of 6.4 kilograms during and immediately after charge, and thus it is necessary to avoid a short pass of such mixture directly to the discharge outlet of mixer 1. In this embodiment, the plastic 20 kilograms corresponding to three program cycle quantity stays in the effective capacity of mixer 1, so that, when the zero-mixed materials are maldistributed with respect to composition immediately after charge, previously charged materials corresponding to two program cycle quantities form a protective layer to prevent the newly charged material from making a short pass. According to my experiments, in the mixer of this embodiment where the stay quantity is 20 kilograms, there occurred no problem in view of mixing and composition even in the use of an injection molding machine of which one shot weight was 6 kilograms. The agitating vanes sof agitator 2 are formed of elliptical rods whose major axes are horizontal, and the speed of rotation is variable from 20 to 100 r.p.m. Under such conditions, satisfactory mixing with the pigment was accomplished at 30 to 50 r.p.m. regardless of whether the plastic was pellet or powder.

The following are some examples of program setting, used with this embodiment and of variations of pigment concentration occurring due to a change of the plastic measuring and feeding digital set values by one from the respective programs.

| | Digital values | | Pigment concentration |
|---|---|---|---|
| | Pigment | Plastic | Percent by weight |
| Program 1a | 1 (32 grams) | 177 | 0.497 |
| Program 1b | 1 (32 grams) | 176 | 0.500 |
| Program 2a | 1 (32 grams) | 88 | 0.995 |
| Program 2b | 1 (32 grams) | 87 | 1.006 |

As will be understood clearly from the above table, notwithstanding the fact that the pigment is in a considerably large fixed quantity in this embodiment, remarkably fine adjustment of pigment concentration is rendered possible by changing the plastic preset digital value by 1.

In the conventional processing industry, every automatic coloring apparatus intended to be mounted to each processor was a batch type agitator, so that the quantity of plastic to be charged to the agitator at each batch was fixed. In the batch type mixer, the desired mixing capability cannot be displayed unless plastic is charged up to the full effective capacity of the mixer. Accordingly, the features of measurement in the conventional system is based on the principle of plastic (major component) fixed measurement and pigment (minor component) variable measurement. As compared with this, the system of the present invention is basically characterized in that major component variable measurement and minor component fixed measurement can be performed, though the pigment measurement level is also variable. In the conventional method, it was obliged that fixed measurement was adopted for a major amount of plastic (for example, 10 kilograms) which is measurable very easily due to good fluidity in physical property and large quantity, and that a minor amount of pigment corresponding to said plastic at the compounding ratio was measured with a high accuracy at a desired point in a wide measuring range (for example, from 10 to 200 grams). Consequently, it was impossible to achieve practically satisfactory capability because of the difficult measuring operation to be performed on the minor amount side where handling of physical property is hard. However, as this invention employs a continuous mixer, feed of the plastic is required merely to replenish a level decrease in the vessel, and subdivision of the replenishment is not concerned. On the pigment (minor component) side, it is very difficult to perform automatic measuring and feeding with a high accuracy, in view of quantity and physical property. However, if the condition is extremely narrowed to such a degree that intermittent measurement of a fixed quantity (for example, 32 grams in this embodiment) with a high accuracy is the only requisite, then the difficulties in selection and development of a minor component measuring-feeding apparatus are widely decreased, and thus the situation is so improved that an apparatus of remarkably high reliability with respect to accuracy can be accomplished at low cost.

Heretofore, technical problems and high cost in the automatic coloring apparatus were attributed mostly to the difficulty in obtaining a reliable automatic pigment measuring-feeding apparatus. From this point of view, the employment of continuous mixer 1 of this invention has basically eliminated the existing technical difficulties in the automatic coloring apparatus with respect to the above-described "major component variable measurement," leading to an improved mixing efficiency and many other advantages.

Figure 5:
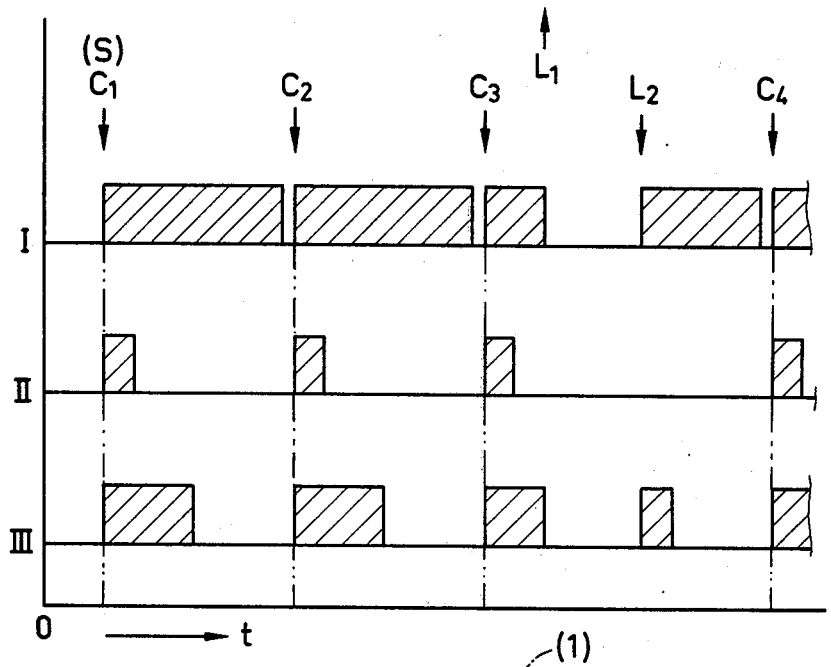
FIG. 5 is a diagram for explaining an example of feed timing of the material components.

FIG. 5 shows an example of material feeding effected by the control system used in this invention. Horizontal axis t means time base. I, II and III present three components to be fed; I is the major polymer, II is the pigment and III other polymer. Each horizontal bottom line denotes that feeding is at a stop, and each upper line denotes that feeding is proceeding. The 2-dot broken lines parallel with the vertical axis show a feed block corresponding to one program cycle.

Operation starts at the left end. At first, when a power switch is turned on at a time point S, the feeding of the three components starts simultaneously by an instruction C1 from a program controller. (Each downward arrow denotes a "operation start" instruction, and the upward arrow denotes an "operation stop" instruction.)

Figure 6:
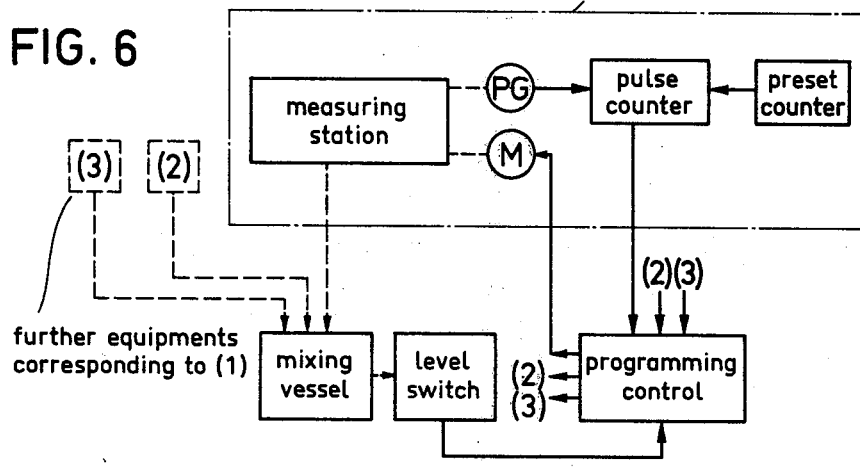
FIG. 6 is a block diagram of the continuous mixing vessel of this invention.

When the substance level in the mixing vessel is low, feeding is kept on until the substance level has reached the upper limit of the level controller, and upon completion of each component feeding corresponding to one program cycle, the program controller generates an instruction C2 to start feeding of the next measuring-feeding program cycle. At the point of time when feeding of the new program cycle has been completed, if the substance level has not yet reached the upper limit of the level controller, the program controller generates an instruction C3 in the same manner as in the preceding case, thereby starting feeding of the next program cycle. Suppose now that at the point indicated by L1, the substance level in the mixing vessel has reached the upper limit of the level controller. At point L1, regarding component I of which feeding time of one program cycle is the longest, feeding has proceeded about ⅓ of one program cycle. At the same point, the entire feeding of one program cycle has been completed for component II, while feeding of component III has proceeded about ⅔ of one program cycle. The level controller generates instruction L1 to stop the measuring-feeding apparatus for components I and II at that point, thereby interrupting the entire material feeding. In this case, digital counters for components I, II and III remain out of operation while indicating the digital counts that have been fed until the interruption. Polymer processor keeps consuming the substance in the mixing vessel, and when the substance level has reached the lower limit of the level controller, instruction L2 is generated by the level controller so as to resume feeding. Then, feeding proceeds from the digital counters at the point of interruption in the program cycles of components I and III, and thus feeding of the remaining program cycle prior to the interruption is completed. If the substance level in the mixing vessel is still low even at the time point of completion, feeding of a new program cycle is started by instruction C4 from the program controller, and subsequently the same feeding is kept on until an upper limit instruction is generated by the level controller. FIG. 6 shows a block diagram of the measuring-feeding control system described above.

Mixer 1 of this invention is directly mountable to material inlet port 16 of an ordinary plastic processor, and one of its features is that a hopper provided for the processor (hereinafter referred to as processor hopper) can be eliminated. In the former days when 25-kilogram bags were used for charging the material to the machine, the processor hopper served to maintain a storage capacity so as to concentrate the working time for charging. At present, however, the storage capacity is held by a silo or container, and a hopper loader always delivers a required quantity to the processor, so that the processor hopper serving as a large storage capacity is no longer necessary. But until the present, this fact has not been recognized, and the large-size processor hopper has been in use just because that mixing of pigment and plastic is often performed manually and then the mixture is carried to the processor hopper, and also because the large-sized processor hopper is advantageous for stabilizing the operation since the conventional automatic coloring apparatus is of batch type. According to this invention, what needs cleaning at the time of color change is only the mixer 1 of a small capacity, so that color change is possible within a short period of time. In the case of the conventional batch type automatic coloring apparatus, a long time of 3 to 4 hours was required for color change together with cleaning of the processor hopper.

Since plastic material is usually delivered by means of a hopper loader, the required storage capacity of plastic hopper 5 ranges from 5 to 15 kilograms, which is sufficient to serve as a buffer, so that the overall installation of this invention is considerably small as compared with the large-sized processor hopper.

Next, the component parts of this invention will be described in detail. The vessel of mixer 1 (hereinafter referred to as mixing vessel) is of substantially vertical construction so that the natural flow of the substance due to gravity forms a piston flow in the mixing vessel. The vessel has a feed inlet port in the upper portion and a discharge outlet port in the lower portion. Requisite for "substantially vertical" is that the line penetrating through the center of the horizontal sectional area of the mixing vessel is within 30 degrees from a vertical line.

As for the shape of mixing vessel, any of the following shapes is selectable: circular cylinder, elliptical cylinder, square cylinder, conical, or any combination of the foregoing. A proper value of length-width ratio of the mixing vessel cannot be prescribed sweepingly as it differs depending on the combination of materials to be mixed, purpose of mixing, and capacity allowance of the mixing vessel. However, in any vessel where separation is apt to occur due to gravity, an excessively large vertical length is liable to cause separation. Therefore, a desirable ratio of the length against the diameter generally ranges from 3 to ½.

In spite of the vertical shift of agitator 2, the piston flow should be kept as far as possible. In this invention, therefore, aiming to make the plane of rotation horizontal, a rotary agitator is used with its rotating shaft being set substantially vertical. "Substantially vertical" includes those having an inclination within 30 degrees from a vertical line. Even when the plane of rotation is made horizontal, the piston flow is disturbed if the agitator vanes have vertical discharging capability (for example, propeller having vertical pitch). In case thee is a large allowance in the effective capacity of the mixing vessel and the purpose of application does not demand complete mixing, vertical back flow caused by the agitator vanes (particularly in the lower portion of the mixing vessel) may be permitted. However, when satisfactory mixing such as that of pigment and polymer is intended, or when the mixing vessel capacity is formed most economically, it is preferable that no vertical pitch exists in the agitator vanes through the entire vessel length. Usable types include, as mentioned already, horizontal plate, square rod, round rod, or elliptical rod without vertical pitch. Rotation speed of the agitator differs with diameter of mixing vessel, diameter of agitator vane, materials to be mixed, and purpose of mixing. In view of this point, the present invention has no specific restriction, and proper mixing can be effected easily in a range from 20 to 2,000 r.p.m.

The feeding method to the mixer and the control system are as follows. It is desirable that a volumetric measuring-feeding apparatus is used for a minor component such as pigment which is less than 2 percent of the total materials. For other component of more quantity such as material polymer, either a volumetric or gravimetric measuring-feeding apparatus is used. As already stated, since this invention is capable of fundamentally utilizing the advantage of minor component fixed measurement-major component variable measurement system, the requisite is only the measurement of a certain fixed quantity (or its multiple) of the minor component. Under such condition, as viewed from both cost and accuracy, the volumetric measuring-feeding apparatus obtainable is far more excellent.

For measuring and feeding the polymer, differing from the pigment side, the measuring-feeding apparatus need not be connected directly to the mixer, and the measured quantity can be forwarded accurately through a hose connection or a shoot system to the mixing vessel without any trouble, so that shock-proof construction is not required for the measuring-feeding apparatus. Moreover, since the quantity of one measurement is large and there is no problem with respect to the physical property for automatic weighing, a gravimetric measuring-feeding apparatus is also usable as well as a volumetric one.

Gravimetric apparatuses in general use are applicable to this invention. As a volumetric measuring-feeding apparatus for both major and minor components adapted for use in this invention, the measuring disk with holes described in the embodiment of FIG. 4 is remarkably excellent. It is also possible to use other type volumetric apparatus which performs continuous measurement and discharge in proportion to the mechanical displacement of the measuring-feeding apparatus. But a screw feeder cannot be regarded as a volumetric measuring-feeding apparatus in a strict sense because of a slip existing between the mechanical displacement and the material to be discharged, and thus it is not suitable for this invention. Desirable volumetric measuring-feeding apparatus for use in this invention is the one without such slip. Whether an apparatus is applicable or not to this invention can be discriminated through measurement of weight error conducted while keeping the material fixed and widely changing the external conditions other than the material by varying the material level to the upper or lower limit in the hopper of the measuring-feeding apparatus. Thus, the performance in practical operation is accurately estimated by such a short-time test.

Substance which can be handled in the system of this invention includes polymer in the form of pellet, grain, or powder, pigment, and other addition agents. Moreover, a small amount of liquid can also be compounded as an addition agent. As a measuring-feeding apparatus for such purpose, it is convenient to utilize a reciprocating fixed-displacement pump (diaphragm or plunger type) which is capable of generating a digital signal in proportion to a discharge cycle.

The discharge outlet port of the mixer of this invention can be connected directly to the material inlet port of polymer processor as in injection molding, extrusion molding, or blow molding, if the inlet port has a capability to receive the material quantitatively. This makes possible the formation of an extremely simplified and yet highly efficient processing line, and it is the application field where the greatest effect is displayed. This mixer is rendered usable also to a material inlet port without the capability of quantitative reception such as the inlet port of Banbury mixer by interposing, between the discharge outlet port and the inlet port, a control device such as a rotary valve controlled from the material consumption speed in the latter stage.

In polymer processing steps, due to the material property or product specifications, it is relatively frequent that drying of the polymer material is required in the stage immediately before feeding to the processor. In the case where the polymer is fed to the processor after being compounded and mixed with the pigment, if the polymer is dried prior to being compounded with the pigment, absorption of moisture from air occurs again in the step of mixing the polymer with the pigment and also in the subsequent travel stage. According to the conventional technology, therefore, it is necessary, after the polymer and the pigment are mixed, to subject the polymer to which the pigment is adhering to a drier and then to feed the materials to the processor. For this reason, in the conventional method, a troublesome operation of cleaning mixer, drier, and the delivery path between them was necessary at each time of color change. In the continuous mixer of this invention, however, it is possible to utilize the mixing vessel also as a drier by sending a hot wind from the lower portion of the mixing vessel and via the pumps 17 by purging it from the upper side via the pump 18 so that, differing from the conventional method, high-accuracy coloring and drying can be accomplished simultaneously in one step.

As an alternative solution, the mixing vessel may have a double walled structure in order to form a space in which a circulating heating medium, such as a liquid, may be introduced, whereby the material is dried by conveying it along the heated inner surface of the mixing space.

The advantages of this invention are itemized as follows.

a. Continuous mixing of this invention renders possible the adoption of major component variable measurement system in the field of automatic coloring apparatus for the first time, so that minor component measurement can be performed at low cost with high accuracy and high reliability. At the resultant high compounding accuracy, the problems left unsettled by the former automatic coloring apparatus are completely solved.

b. Major component quantity of one program cycle is changeable as desired, and if necessary, minor component can be set digitally to a value several to ten times as large as the minimum measuring unit. Thus, by combining the respective changes of major and minor component quantities, the compoundable concentration range is remarkably widened with a high accuracy being maintained, as compared with the former major component fixed measurement system.

c. A procesor hopper is rendered unnecessary due to the employment of a vertical charge type continuous mixer which is level controlled.

d. In addition to remarkable improvement of the capability, the overall equipment is formed into an extremely small structure, and the number of component parts is minimized to achieve low cost. Furthermore, in case of using as an automatic coloring apparatus, labor and time for color change are greatly economized.

e. When used as an automatic coloring apparatus, since this invention is based on the continuous mixing system, it eliminates uneven coloring which is liable to occur between batches in the batch type apparatus, thereby steadily obtaining products of uniformly compounded composition.

f. The mixing vessel is usable also as a drier, so that high-accuracy coloring and drying can be performed simultaneously in one step.

What is claimed is:

1. A compounding and blending apparatus comprising:
   1. a mixing vessel for blending main and subsidiary raw materials;
   2. a hopper for the main raw material attached to said mixing vessel, said hopper being equipped with a volume type metering device which has a metering and feeding opening connected to an upper raw material feed opening of the mixing vessel and which is actuated by an electric motor;
   3. at least one hopper for a subsidiary raw material, said hopper being equipped with a volume type metering device which has a metering and feeding opening connected to the upper raw material feed opening of the mixing vessel and which is actuated by an electric motor;
   4. a level switch for emitting "on" signals when the level of the mixture in said mixing vessel reaches a predetermined reduced level;
   5. pulse generators arranged with the respective volume type metering devices to be actuated by said metering devices to emit pulse signals every time the corresponding metering devices meter predetermined unit volumes of the raw materials;
   6. manually presettable counters for metering the main raw material and subsidiary raw material based on unit dose volumes of the raw materials corresponding to a predetermined compounding ratio of the raw materials, said counters being connected to the corresponding pulse generators; and
   7. a program controller connected to each of said counters, said level switch and each of the electric motors for the metering devices of said hoppers, said program controller being so arranged and constructed that, when it receives "on" signals from said level switch, it emits operation signals for rotating each of said electric motors and that, when the numbers of pulses transmitted by the respective pulse generators reach the pre-set count numbers of said counters, said program controller emits signals for temporarily stopping the electric motors, whereby a unit program cycle for attaining the desired compounding ratio of the main and subsidiary raw materials is performed when the count number of each of said counters reaches the predetermined value and supply of the main and subsidiary raw materials compensating for the reduced amount of the mixture may be continuously conducted by repeating the unit program cycle by automatic re-setting of said counters.

2. A compounding and blending apparatus according to claim 1
   wherein said mixing vessel includes a substantially vertical mixing space allowing the materials to sink by gravity through that space and
   further comprising at least one rotary agitator disposed within the substantially vertical mixing space in said mixing vessel and having a substantially vertical rotary shaft carrying agitation vanes, said agitation vanes being constructed so as to move the materials mainly in a substantially horizontal plane rather than in the vertical direction, whereby the initial non-uniformity of the composition is destroyed and the composition is rendered homogeneous during passage of the materials through the substantially vertical mixing space in said mixing vessel.

3. A compounding and blending apparatus according to claim 2 and further comprising means for sending hot air into said mixing vessel from a lower portion thereof and for exhausting the hot air from an upper portion thereof, whereby the materials are dried in said mixing vessel.

4. A compounding and blending apparatus according to claim 2 and further comprising means for heating the wall of said mixing vessel, whereby the materials may be dried in said mixing vessel by conveying them along the inner surface of said mixing vessel.

5. A compounding and blending apparatus according to claim 4 wherein said mixing vessel has a double-walled structure forming a space for introducing a circulating heating medium therein.

* * * * *

Disclaimer and Dedication 3,985,345.—*Peter Michael Jakob*, Offenbach, Germany. CONTINUOUS COMPOUNDING AND MIXING APPARATUS. Patent dated Oct. 12, 1976. Disclaimer and Dedication filed Mar. 14, 1980, by the assignee, *Colortronic Reinhard & Co. KG*.

Hereby disclaims and dedicates to the Public all claims of said patent.
[*Official Gazette, May 6, 1980.*]